(12) United States Patent
Baek

(10) Patent No.: US 9,091,765 B2
(45) Date of Patent: Jul. 28, 2015

(54) APPARATUS FOR MEASURING RADIOACTIVITY OF RADIOACTIVE SAMPLE WITHOUT LOSS OF RADIOACTIVE PARTICLES

(71) Applicant: KEPCO ENGINEERING & CONSTRUCTION COMPANY, INC., Yongin-si, Gyeonggi-Do (KR)

(72) Inventor: You Seok Baek, Gyeonggi-Do (KR)

(73) Assignee: KEPCO Engineering & Construction Company, Inc., Gyeonggi-Do (KR)

( * ) Notice: Subject to any disclaimer, the term of this patent is extended or adjusted under 35 U.S.C. 154(b) by 389 days.

(21) Appl. No.: 13/932,979

(22) Filed: Jul. 1, 2013

(65) Prior Publication Data

US 2014/0021363 A1    Jan. 23, 2014

(30) Foreign Application Priority Data

Jul. 19, 2012   (KR) .................. 10-2012-0078965

(51) Int. Cl.
*G01T 1/18*   (2006.01)
*G01T 7/04*   (2006.01)

(52) U.S. Cl.
CPC ........................ *G01T 7/04* (2013.01)

(58) Field of Classification Search
USPC ....................................................... 250/380
See application file for complete search history.

(56) References Cited

U.S. PATENT DOCUMENTS 4,055,083 A * 10/1977 Haas ........................... 73/861.04
4,663,113 A *  5/1987 Jester et al. ................... 376/256

5,977,547 A * 11/1999 Phillips et al. ................ 250/393
7,402,800 B2 *  7/2008 Delvigne et al. ............. 250/303
2004/0129890 A1 *  7/2004 Berman et al. ................ 250/380

FOREIGN PATENT DOCUMENTS

JP      62-140434        4/1987
JP      6-070674         9/1994
JP      11-344570        12/1999

(Continued)

OTHER PUBLICATIONS

Korean Office Action dated Aug. 27, 2013 corresponding to Korean Patent Application No. 10-2012-0078965; English language translation; (7 pages total).

(Continued)

*Primary Examiner* — Christine Sung
(74) *Attorney, Agent, or Firm* — Stolowitz Ford Cowger LLP

(57) ABSTRACT

Provided is an apparatus for measuring radioactivity without loss of radioactive particles. The apparatus includes a sampler that collects a radioactive sample from an exhaust pipe, a sample detector that is provided adjacent to the exhaust pipe and includes a particle collecting filter and a first radioactivity detector, a sample transporting pipe that extends from the sample detector and transports the radioactive sample from which the radioactive particles have been removed, a sample transporting pump that is provided at the sample transporting pipe, and a gaseous radioactivity detector that is provided at the sample transporting pipe and detects a radioactivity of the radioactive sample from which the radioactive particles have been removed. The particle collecting filter filters out the radioactive particles from the radioactive sample and the first radioactivity detector detects a radioactivity of the radioactive particles filtered out by the particle collecting filter.

10 Claims, 1 Drawing Sheet

(56) References Cited

FOREIGN PATENT DOCUMENTS

JP     3343247 B2    8/2002
JP     4376590 B2    9/2009

OTHER PUBLICATIONS

Korean Patent Office issuance of Notice of Allowance, dated Dec. 24, 2013 corresponding to Korean Patent Application No. 10-2012-0078965; English language translation; (7 pages total).

* cited by examiner

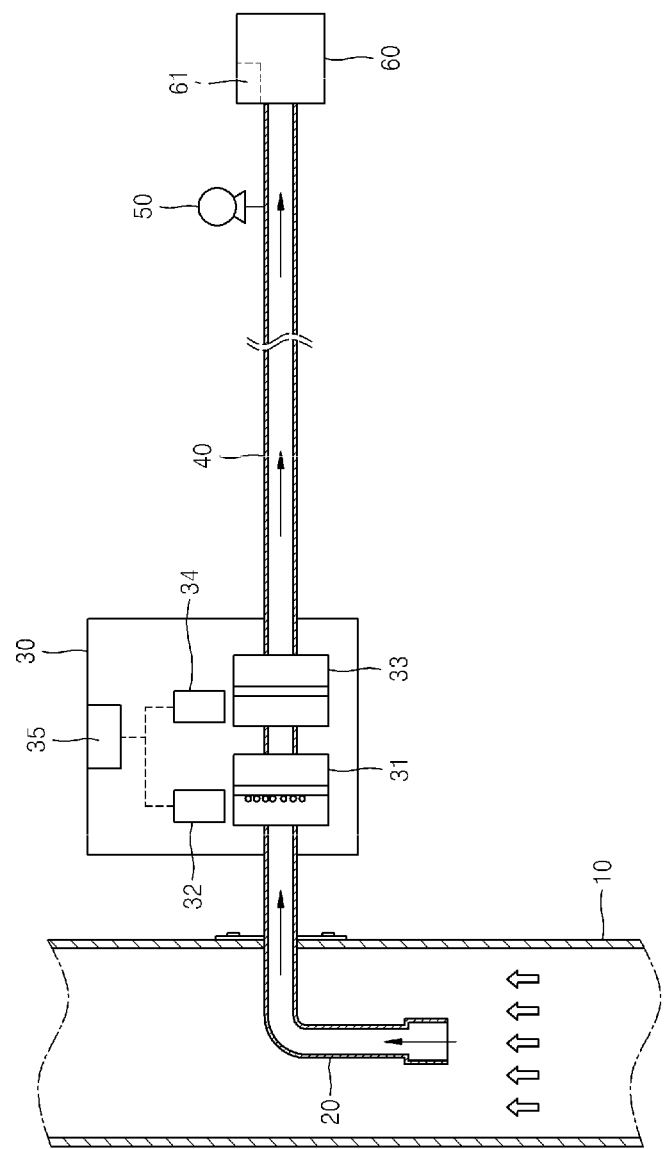

APPARATUS FOR MEASURING RADIOACTIVITY OF RADIOACTIVE SAMPLE WITHOUT LOSS OF RADIOACTIVE PARTICLES

CROSS-REFERENCE TO RELATED PATENT APPLICATION

This application claims the benefit of Korean Patent Application No. 10-2012-0078965, filed on Jul. 19, 2012, in the Korean Intellectual Property Office, the disclosure of which is incorporated herein in its entirety by reference.

BACKGROUND OF THE INVENTION

1. Field of the Invention

The present invention relates to an apparatus for measuring radioactivity of radioactive particles without loss of the radioactive particles, and more particularly, to an apparatus for measuring radioactivity without loss of radioactive particles, which can accurately measure a radioactivity of radioactive particles included in a radioactive sample collected from air including the radioactive particles when measuring the radioactivity of the radioactive sample.

2. Description of the Related Art

In nuclear power plants, there are radioactive materials that are generated in nuclear fission in a nuclear reactor and in processing a nuclear fuel and radioactive waste. It is very important to accurately measure a radioactivity included in air in order for radioactive materials not to harm the health of the general public and operators of nuclear power plants.

Representative radioactive materials in air are classified into a particulate radioactivity, iodine, and a rare gas, and detected. In conventional nuclear power plants, generally, since a sufficient space for installing a radioactivity detector is not secured near pipes and ducts and it is unable to install a radioactivity measuring apparatus in an area in which pollution of electronic equipment is expected, a sampler for collecting a radioactive sample is installed in each of the pipes and ducts, and a radioactive sample collected by the sampler is transported through a transport pipe that extends by a considerable length. A radioactive detector is installed at an end portion of the transport pipe, and measures a radioactivity of the radioactive sample received through the transport pipe.

However, since particulate radioactive materials included in the radioactive sample have a size and a weight, the particulate radioactive materials are deposited on a bottom of the transport pipe due to gravity, and the particulate radioactive materials are lost due to the roughness of an inner wall, a gap of a joint, or an isolation valve of the transport pipe. For this reason, when the transport pipe is considerably long, a value measured by the radioactivity detector is very inaccurate.

Moreover, since a position at which the sampler is installed is limited to a position which is checked through a flow analysis of a pipe or duct as having a small speed deviation and relatively uniformly distributed radioactive samples, the transport pipe connecting the sampler to the radioactivity detector becomes longer, and particulate radioactive materials are accordingly greatly lost.

It is required to correct an inaccuracy of a measurement value in consideration of the loss of particulate radioactive materials. However, considering all accurate basis data of loss factors generated in construction, such as the specifications of used materials and the position of a joint, is very difficult, and moreover, there is no method that quantitatively, accurately measures a loss rate. There remains a limitation in that an inaccurate measurement value is inevitably used as-is.

SUMMARY OF THE INVENTION

The present invention provides an apparatus for measuring radioactivity of radioactive particles without loss of the radioactive particles, which can accurately measure a radioactivity of radioactive particles included in a radioactive sample collected from air including the radioactive particles when measuring the radioactivity of the radioactive sample.

According to an aspect of the present invention, there is provided an apparatus for measuring radioactivity without loss of radioactive particles, including: a sampler that collects a radioactive sample from an exhaust pipe in which air including radioactive particles flows; a sample detector that is provided adjacent to the exhaust pipe, and included a particle collecting filter and a first radioactivity detector, wherein the particle collecting filter filters out the radioactive particles from the radioactive sample and the first radioactivity detector detects a radioactivity of the radioactive particles filtered out by the particle collecting filter; a sample transporting pipe that extends from the sample detector and transports the radioactive sample from which the radioactive particles have been removed; a sample transporting pump that is provided at the sample transporting pipe and provides suction power so that the radioactive sample is transported through the sample transporting pipe; and a gaseous radioactivity detector that is provided at the sample transporting pipe, and detects a radioactivity of the radioactive sample from which the radioactive particles have been removed.

The sample detector may include: an iodine collecting filter that collects iodine included in the radioactive sample; and a second radioactivity detector that detects a radioactivity of the iodine filtered out by the iodine collecting filter.

Radioactive information detected by the first radioactivity detector may be transmitted to an information receiver disposed at a remote position.

Information about the radioactivity detected by the second radioactivity detector may be transmitted to an information receiver disposed at a remote position.

The information receiver may be included in the gaseous radioactivity detector.

According to an another aspect of the present invention, there is provided an apparatus for measuring radioactivity without loss of radioactive particles, including: a sampler that collects a radioactive sample from an exhaust pipe in which air including radioactive particles flows; a sample detector that is provided adjacent to the exhaust pipe and includes a particle collecting filter, a first radioactivity detector, and a transmitter, wherein the particle collecting filter filters out the radioactive particles included in the radioactive sample, the first radioactivity detector detects a radioactivity of the radioactive particles filtered out by the particle collecting filter, and the transmitter transmits radioactive information detected by the first radioactivity detector to an outside; and an information receiver that receives the radioactive information transmitted from the transmitter.

The apparatus may further include: a sample transporting pipe that extends from the sample detector and transports the radioactive sample from which the radioactive particles have been removed; a sample transporting pump that is provided at the sample transporting pipe and provides suction power so that the radioactive sample is transported along the sample transporting pipe; and a gaseous radioactivity detector that is provide at the sample transporting pipe and detects a radioactivity of the radioactive sample from which the radioactive particles have been removed.

The sample detector may include: an iodine collecting filter that collects iodine included in the radioactive sample; and a second radioactivity detector that detects a radioactivity of the iodine filtered out by the iodine collecting filter.

The transmitter may transmit the information about the radioactivity detected by the second radioactivity detector to the information receiver.

The information receiver may be included in the gaseous radioactivity detector.

BRIEF DESCRIPTION OF THE DRAWINGS

The above and other features and advantages of the present invention will become more apparent by describing in detail exemplary embodiments thereof with reference to the attached drawings in which:

FIG. 1 is a conceptual view schematically illustrating a radioactivity measuring apparatus according to an embodiment of the present invention.

DETAILED DESCRIPTION OF THE INVENTION

Hereinafter, embodiments of the present invention will be described in detail with reference to the accompanying drawings.

FIG. 1 is a conceptual view schematically illustrating an apparatus for measuring radioactivity without loss of radioactive particles according to an embodiment of the present invention.

Referring to FIG. 1, the apparatus for measuring radioactivity without loss of radioactive particles includes a sampler 20, a sample detector 30, a sample transporting pipe 40, a sample transporting pump 50, and a gaseous radioactivity detector 60.

The sampler 20 is provided for collecting a radioactive sample. The sampler 20 is installed at an exhaust pipe 10 in which air including radioactive particles flows, and collects the radioactive sample. The exhaust pipe 10 may be a pipe or duct provided in a nuclear power plant.

The sample detector 30 is prepared adjacent to the exhaust pipe 10. The sample detector 30 includes a particle collecting filter 31 and a first radioactivity detector 32.

The particle collecting filter 31 filters out radioactive particles included in the radioactive sample collected by the sampler 20.

In the specification, the radioactive sample denotes a sample that is collected from air including radioactive particles flowing through the exhaust pipe 10, and the radioactive particles denotes particulate radioactive materials having a weight and a size.

The first radioactivity detector 32 detects a radioactivity of the radioactive particles filtered out by the particle collecting filter 31.

That is, in the radioactivity measuring apparatus according to the present embodiment, the sample detector 30 is provided adjacent to the exhaust pipe 10 in order to address a problem that radioactive particles are deposited on a bottom of the sample transporting pipe 40 due to gravity when the radioactive particles are transported a long distance, so that a radioactivity of the radioactive particles may be accurately measured.

The sampler 30 used in the present embodiment includes an iodine collecting filter 33 and a second radioactivity detector 34.

The iodine collecting filter 33 is prepared for collecting and filtering out iodine from the radioactive sample. The second radioactivity detector 34 is provided for detecting a radioactivity of the iodine filtered out by the iodine collecting filter 33.

According to the present embodiment, information about the radioactivity detected by the first and second radioactivity detectors 32 and 34 is transmitted to an information receiver 61 disposed at a remote place. Since the first and second radioactivity detectors 32 and 34 are prepared adjacent to the exhaust pipe 10, it is not easy for an operator to access the first and second radioactivity detectors 32 and 34, and for this reason, the information about the radioactivity detected by the first and second radioactivity detectors 32 and 34 is transmitted to the information receiver 61 disposed at a remote place.

According to the present embodiment, the information receiver 61 may be included in the gaseous radioactivity detector 60, which is described below. The gaseous radioactivity detector 60 is provided for detecting a radioactivity of a gaseous radioactive sample when a radioactive sample from which radioactive particles have been removed is transported via the sample transporting pipe 40. The gaseous radioactivity detector 60 is disposed at a remote position sufficiently far away from the sample detector 30.

The sample detector 30 used in the present embodiment includes a transmitter 35 for transmitting the information about the radioactivity detected by the first and second radioactivity detectors 32 and 34 to the outside. The transmitter 35 transmits the radioactive information to the information receiver 61.

The transmitter 35 may transmit the radioactive information to the information receiver 61 in a wired manner or a wireless manner. As described above, the information receiver 61 may be included in the gaseous radioactivity detector 60.

The sample transporting pipe 40 extends from the sample detector 30. The radioactive sample, from which the radioactive particles are filtered out by the particle collecting filter 31, is transported through the sample transporting pipe 40.

The sample transporting pipe 50 is provided at the sample transporting pipe 40, and provides suction power in order for the radioactive sample to be transported along the sample transporting pipe 40.

The gaseous radioactivity detector 60 is prepared at the sample transporting pipe 40, and detects a radioactivity of the radioactive sample from which the radioactive particles have been removed. According to the present embodiment, the gaseous radioactivity detector 60 may be disposed at a remote position considerably far away from the sample detector 30, and as described above, the gaseous radioactivity detector 60 may include the information receiver 61.

Therefore, the gaseous radioactivity detector 60 may supply a radioactivity measurement value of the radioactive sample from which the radioactive particles have been removed, and a radioactivity measurement value of the radioactive particles, received from the sample detector 30, to the operator.

As such, in the apparatus for measuring radioactivity without loss of radioactive particles according to the present embodiment, the sample detector 30 including all of the particle collecting filter 31 and the first and second radioactivity detectors 32 and 34 is provided adjacent to the exhaust pipe 10, in which air including radioactive particles flows, and thus a radioactivity of the radioactive particles may be accurately measured without loss of the radioactive particles.

That is, the radioactivity measuring apparatus according to the present embodiment prevents a deposition from being caused by gravity, a loss from being caused by a static electricity, or a loss of radioactive particles from being caused by a gap of the joint of the sample transporting pipe 40, an internal roughness of the sample transporting pipe 40, or a bent pipe portion when radioactive particles are transported a long distance, as in the related art.

Moreover, the sample transporting pipe 40 extending from the sample detector 30 transports a gaseous radioactive sample from which radioactive particles have been removed, and thus, the gaseous radioactive sample may be transported independently from a distance.

Therefore, in the apparatus for measuring radioactivity without loss of radioactive particles according to the present embodiment, the sample detector 30 measures radioactive particles included in a radioactive sample, and the gaseous radioactivity detector 60 measures a radioactivity of the radioactive sample from which the radioactive particles have been removed, thus accurately measuring a radioactivity of the radioactive sample.

Ultimately, the radioactivity measuring apparatus according to the present invention accurately measures a radioactivity value directly related to the health of workers of nuclear power plants and the general public to prevent a risk of radioactive pollution, thus contributing to safely operate the nuclear power plants.

Moreover, since there is no restrictive factor in the design specifications, such as an installation position of the gaseous radioactivity detector 60 and a shape of the sample transporting pipe 40, an equipment arrangement design is flexible, thus providing a convenience of construction and saving the construction costs.

Moreover, an expensive sample transporting pipe satisfying the requirements for an internal roughness does not need to be used, thus saving the construction costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for measuring radioactivity without loss of radioactive particles, the apparatus comprising:
   a sampler that collects a radioactive sample from an exhaust pipe in which air comprising radioactive particles flows;
   a sample detector that is provided adjacent to the exhaust pipe, and comprises a particle collecting filter and a first radioactivity detector, wherein the particle collecting filter filters out the radioactive particles from the radioactive sample and the first radioactivity detector detects a radioactivity of the radioactive particles filtered out by the particle collecting filter;
   a sample transporting pipe that extends from the sample detector and transports the radioactive sample from which the radioactive particles have been removed;
   a sample transporting pump that is provided at the sample transporting pipe and provides suction power so that the radioactive sample is transported through the sample transporting pipe; and
   a gaseous radioactivity detector that is provided at the sample transporting pipe, and detects a radioactivity of the radioactive sample from which the radioactive particles have been removed.

2. The apparatus of claim 1, wherein the sample detector comprises:
   an iodine collecting filter that collects iodine included in the radioactive sample; and
   a second radioactivity detector that detects a radioactivity of the iodine filtered out by the iodine collecting filter.

3. The apparatus of claim 2, wherein information about the radioactivity detected by the second radioactivity detector is transmitted to an information receiver disposed at a remote position.

4. The apparatus of claim 3 wherein the information receiver is included in the gaseous radioactivity detector.

5. The apparatus of claim 1, wherein radioactive information detected by the first radioactivity detector is transmitted to an information receiver disposed at a remote position.

6. The apparatus of claim 5 wherein the information receiver is included in the gaseous radioactivity detector.

7. An apparatus for measuring radioactivity without loss of radioactive particles, the apparatus comprising:
   a sampler that collects a radioactive sample from an exhaust pipe in which air comprising radioactive particles flows;
   a sample detector that is provided adjacent to the exhaust pipe and comprises a particle collecting filter, a first radioactivity detector, and a transmitter, wherein the particle collecting filter filters out the radioactive particles included in the radioactive sample, the first radioactivity detector detects a radioactivity of the radioactive particles filtered out by the particle collecting filter, and the transmitter transmits radioactive information detected by the first radioactivity detector to an outside; and
   an information receiver that receives the radioactive information transmitted from the transmitter; and
   a sample transporting pipe that extends from the sample detector and transports the radioactive sample from which the radioactive particles have been removed;
   a sample transporting pump that is provided at the sample transporting pipe and provides suction power so that the radioactive sample is transported along the sample transporting pipe; and
   a gaseous radioactivity detector that is provide at the sample transporting pipe and detects a radioactivity of the radioactive sample from which the radioactive particles have been removed.

8. The apparatus of claim 7, wherein the sample detector comprises:
   an iodine collecting filter that collects iodine included in the radioactive sample; and
   a second radioactivity detector that detects a radioactivity of the iodine filtered out by the iodine collecting filter.

9. The apparatus of claim 8, wherein the transmitter transmits the information about the radioactivity detected by the second radioactivity detector to the information receiver.

10. The apparatus of claim 7, wherein the information receiver is included in the gaseous radioactivity detector.

* * * * *